(12) United States Patent
Talakoub et al.

(10) Patent No.: US 9,379,987 B2
(45) Date of Patent: Jun. 28, 2016

(54) MEDIA RATE ADAPTION USING A MEDIAN FILTER

(71) Applicant: BlackBerry Limited, Waterloo (CA)

(72) Inventors: Shahram Talakoub, Waterloo (CA); Sean Bartholemew Simmons, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 308 days.

(21) Appl. No.: 13/961,353

(22) Filed: Aug. 7, 2013

(65) Prior Publication Data

US 2015/0043333 A1 Feb. 12, 2015

(51) Int. Cl.
*H04L 12/825* (2013.01)
*H04L 29/06* (2006.01)
*H04N 21/442* (2011.01)
*H04N 21/6373* (2011.01)
*H04N 21/6437* (2011.01)

(52) U.S. Cl.
CPC ............ *H04L 47/25* (2013.01); *H04L 65/4092* (2013.01); *H04L 65/607* (2013.01); *H04L 65/80* (2013.01); *H04N 21/44209* (2013.01); *H04N 21/6373* (2013.01); *H04N 21/6437* (2013.01)

(58) Field of Classification Search
None
See application file for complete search history.

(56) References Cited

U.S. PATENT DOCUMENTS

| | | | |
|---|---|---|---|
| 2003/0198184 A1* | 10/2003 | Huang et al. | 370/231 |
| 2003/0202506 A1* | 10/2003 | Perkins et al. | 370/352 |
| 2004/0252700 A1* | 12/2004 | Anandakumar et al. | 370/395.21 |
| 2006/0136927 A1* | 6/2006 | Covell et al. | 718/105 |
| 2008/0091838 A1* | 4/2008 | Miceli | 709/231 |
| 2009/0204696 A1* | 8/2009 | Zhang et al. | 709/223 |

* cited by examiner

*Primary Examiner* — Chi H Pham
*Assistant Examiner* — Vladislav Agureyev
(74) *Attorney, Agent, or Firm* — Conley Rose, P.C.; J. Robert Brown, Jr.

(57) ABSTRACT

In an exemplary embodiment of this disclosure, a computer-implemented method includes encoding a first portion of media at an encoding rate. The first portion of the media is streamed over a network from a sending device to a receiving device. Feedback is received related to packet events occurring during transmission of the first portion of the media over the network. Adjusted feedback is generated, by a computer processor, by applying a median filter to the feedback data. The encoding rate of the media is adjusted based on the adjusted feedback data. An additional portion of the media is encoded at the adjusted encoding rate.

20 Claims, 5 Drawing Sheets

MEDIA RATE ADAPTION USING A MEDIAN FILTER

BACKGROUND

When media is streamed over a network, that media is generally transmitted in packets. Ideally, the recipient of the streamed media sees the media as continuous. However, if the packets are lost or delayed, the media display may not be smooth or may pause until additional packets are received.

Algorithms exist to dynamically adapt the encoding rate of the media being streamed, and some of such algorithms are based on detected packet loss and packet delay. In general, if packet delay or loss is deemed to be too high, an adaption algorithm will adjust the encoding rate downward. As a result, the media quality may be reduced as received by the recipient, but the media display may occur more smoothly. These adaption algorithms are designed for static network conditions, where changes in packet loss and delay are fairly persistent. The algorithms do not perform well in mobile environments, as a result of the bursty nature of packet loss and delay due to outages.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and methods may be implemented using various techniques, whether currently known or in existence. This disclosure is not limited to the illustrative implementations, drawings, and techniques illustrated below, including the exemplary designs and implementations illustrated and described herein, but may be modified within the scope of the appended claims along with their full scope of equivalents.

While several embodiments are provided in the present disclosure, it will be understood that the disclosed systems and methods may be embodied in many other forms without departing from the spirit or scope of the present disclosure. The present examples are to be considered as illustrative and not restrictive, and the intention is not to be limited to the details given herein. For example, the various elements or components may be combined or integrated in others systems, or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Components shown or discussed as coupled or directly coupled or communicating with one another may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

Various embodiments of this disclosure are adaption systems and methods, which may be embodied in whole or in part in computer program products and devices. An exemplary adaption system may be used to stream media, such as voice over IP (VoIP) audio, other audio, or video over a network, where the media is encoded at a dynamic rate or transmitted at a dynamic rate.

In one embodiment of this disclosure, a computer-implemented method includes encoding a first portion of media at an encoding rate. The first portion of the media is streamed over a network from a sending device to a receiving device. Feedback is received related to packet events occurring during transmission of the first portion of the media over the network. Adjusted feedback is generated, by a computer processor, by applying a median filter to the feedback data. The encoding rate of the media is adjusted based on the adjusted feedback data. An additional portion of the media is encoded at the adjusted encoding rate.

In another embodiment, a system includes a coder, a packetizer, a filter unit, and a rate controller. The coder is configured to encode a first portion of media at a rate. The packetizer is configured to stream the first portion of the media over a network from a sending device to a receiving device. The filter unit is configured to receive feedback data related to packet events occurring during transmission of the first portion of the media over the network, and to generate adjusted feedback data by applying a median filter to the feedback data. The rate controller is configured to adjust the encoding rate of the media based on the adjusted feedback data. The coder is further configured to encode an additional portion of the media at the adjusted encoding rate.

In yet another embodiment, a computer program product includes a non-transitory computer readable storage medium having computer readable program code embodied thereon. The computer readable program code is executable by a processor to perform a method. The method includes encoding a first portion of media at an encoding rate. Further according to the method, the first portion of the media is streamed over a network from a sending device to a receiving device. Feedback is received related to packet events occurring during transmission of the first portion of the media over the network. Adjusted feedback is generated by applying a median filter to the feedback data. The encoding rate of the media is adjusted based on the adjusted feedback data. An additional portion of the media is encoded at the adjusted encoding rate.

Figure 1:
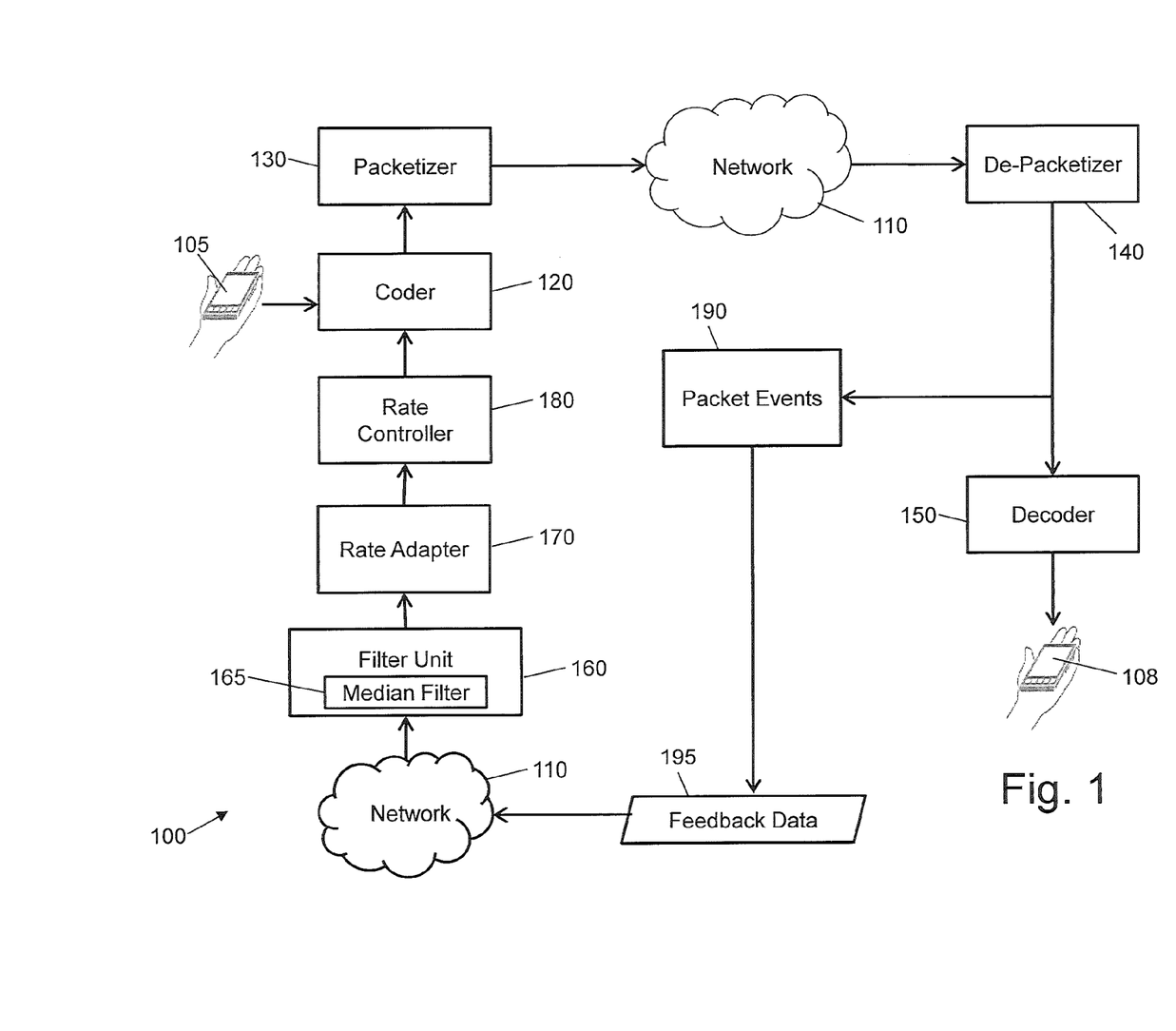
FIG. 1 is a block diagram of an adaption system for adapting the rate of media being streamed, according to an exemplary embodiment of this disclosure.

FIG. 1 is a block diagram of an adaption system 100, according to an exemplary embodiment of this disclosure. The various components of the adaption system 100 illustrated in FIG. 1 may be made up of hardware, software, or a combination of both. Although the various components are shown as being distinct from one another, this distinction is provided for illustrative purposes only. The hardware, software, or both making up the various components may overlap or be further divided, depending on implementation details.

The adaption system 100 may be integrated with, or otherwise in communication with, one or more systems or devices 105 and 108 capable of streaming media or receiving streamed media, such as audio or video. As shown in FIG. 1, such devices 105 and 108 may be mobile electronic devices, but this need not be the case. Rather, the devices 105 and 108 need not be of the same type and may be, for example, mobile phones, laptop or desktop computers, tablets, networked attached storage devices, smart phones, dedicated media players, or other devices.

A sending device 105 may stream media over a network 110 to a receiving device 108. Before the media is transmitted over the network 110, a coder 120 at, or in communication with, the sending device 105 may encode the media. The coder 120 can include a processor or circuitry that can execute codec or encoding instructions to encode the media. The coder 120 may apply a codec to the media, which encodes the media in a particular format and with a particular encoding rate. In the case of audio, this rate may be the sampling rate, and in the case of video, this rate may be the frame rate. In some embodiments, the coder 120 may apply a codec or encoding rate specified by a user at the sending device 105 or the receiving device 108. Alternatively, a default codec and encoding rate may be used.

A packetizer 130 may group the media, which may have been already encoded by the coder 120, into a plurality of packets to be sent across the network 110 to the receiving device 108. The packetizer 130 can include a processor or circuitry that can execute packeting instructions to packetize the encoded media. In some embodiments, the packetizer 130 may use the real-time transport protocol (RTP), which is commonly used to send and receive media over networks. A de-packetizer 140, which may be at or in communication with the receiving device 108, may extract the media from the received packets. The de-packetizer 140 can include a processor or circuitry that can execute de-packeting instructions to use the media received at the receiving device. After the media is extracted from the packets, a decoder 150 may decode the media for display on the receiving device 108. The decoder 150 can include a processor or circuitry that can execute decoding instructions on the de-packeted data at the receiving device 108.

Various packets may have been lost or delayed during transmission over the network 110. Thus, the de-packetizer 140 may also determine details about packet events 190, which events may include lost packets, delayed packets, or both. In some embodiments, the de-packetizer 140 may use the RTP control protocol (RTCP) to determine such details. The receiving device 108 may transmit these details back across the network 110 to the sending device 105 in the form of feedback data 195.

This feedback data 195 may be a series of reports streamed to the sending device 105, where each report is an indication of packet events 190, i.e., lost packets, delayed packets, or both. Each report may be related to packet events 190 occurring within a timeframe, such that the series of reports in the feedback data 195 may represent packets events during the media streaming session.

A filter unit 160, which may be at or in communication with the sending device 105, may filter the feedback data 195 using a median filter 165. The filter unit 160 can include a processor or circuitry that can execute filtering instructions to filter the feedback data. In an exemplary embodiment, the median filter may be applied to the feedback data 195 in a series of windows, where each window covers a quantity of reports in the feedback data 195. When applied to lost packets across a window of reports, the median filter 165 may output a median of the lost packets specified in those reports. Analogously, when applied to delayed packets across a window of reports, the median filter 165 may output a median of the delayed packets specified in those reports. This median may be expressed, for example, in terms of percentages.

In some embodiments, the median filter 165 in operation may receive all the data for a given window, sort the data in order of the values in the window, select the median value and output the selected median value. In an example, the median filter 165 does not average (i.e., take the mean of) the information of the lost packets but instead selects the median value. In application of the median filter 165, the window of reports can be selected to be an odd number of reports such that there is always a median value. If the window of reports is chosen to be an even number, then the median filter 165 may choose one of the two center values as the median or may average those two center values to determine the median value. The median filter 165, in this example, does not average all of the values in the window.

The various windows of the median filter 165 may overlap, such that the output of the median filter 165 may be a rolling median of lost packets, delayed packets, or both. For example, and not by way of limitation, a new window may begin with each report and may span for a known quantity of reports corresponding to the length of the window. The rolling window allows the older lost packet data to be dropped from the calculation of the median. The result of applying the median filter 165 to the feedback data 195 may be a series of medians over time, where the medians represent lost or delayed packets of the streaming media.

The filter unit 160 can have an adaptable or selectable length for the median filter 165, where the length corresponds to the quantity of reports of packet event data in the window. That is, the filter unit 160 can have a filter length of few packet event data, e.g., three or less than six reports. The filter unit 160 can set its window length to less than 10 reports, less than 20 reports, or less than 50 reports. The determination of the length of the window can be based on history of the receiving device 108, e.g., the receiving device 108 rarely loses packets or frequently loses packets, in combination with desired results with respect to reducing the effects of packet event bursts.

Although the filter unit 160 is shown in FIG. 1 as being coupled with the sending device 105, it will be understood that the filter unit 160 may alternatively, or additionally, be located at or in communication with the receiving device 108. In that case, the median filter 165 may be applied to the feedback data 195 before such data is transmitted across the network 110 back to the sending device 105. In that case, the sending device 105 need not also apply a median filter to the feedback data 195.

In conventional adaption systems for streaming media, adaption algorithms consider some measure of packet loss or packet delay when determining how to adapt the encoding rate of the media. A drawback of these conventional systems is that, when applied to feedback data 195 indicating bursty packet loss or delay, the resulting adaption puts too much emphasis on these bursts. Even short bursts of packet loss or delay result in rate reduction and, therefore, in reduced media quality at the receiving device 108.

According to some exemplary embodiments of this disclosure, a rate adapter 170 may apply an adaption algorithm to the output of the median filter 165, which output may be a series of medians as described above. The adaption algorithm used may vary between embodiments, and may be similar to those used in conventional adaption systems, except that the input to the adaption algorithm may already have been adjusted by the filter unit 160. Thus, instead of taking the feedback data 195 as input to an adaption algorithm, as might be done in a conventional system, an exemplary rate adapter 170 may apply the adaption algorithm the feedback data 195 after application of the median filter 165.

According to an exemplary embodiment, the result of such adaption algorithm may be an instruction to modify the current encoding rate of the streaming media, an instruction to modify the transmission rate of the streaming media, or a combination of both. The rate adapter 170 may receive the series of medians in a stream, as the media continues to stream across the network 110. Thus, the rate adapter 170 may output a series of rate adjustment instructions in a stream, where the rate adjustment instructions correspond to the media filter's output in response to the stream of feedback data 195. After application of the median filter 165, the rate adapter 170 may be less sensitive to, or influenceable by, bursty or non-persistent packet events 190, as compared to conventional adaption systems.

The degree of persistency that is required to affect the encoding or transmission rate of the media may be determined, at least in part, by the length of the windows used when applying the median filter 165. A longer window may tend to require longer persistence in order for packet losses to be preserved through the median filter 165. Analogously, a shorter window may require lesser persistence in order to be preserved. For example, with a window that spans eleven reports of packet losses, a burst of losses that lasts through only five reports may not be preserved when applying the median filter 165, as the five reports may all show a percentage of loss that is above the median of the eleven-report window. Further, if a report is received once per second, it can be determined that five seconds of lost packets will likely not affect the encoding or transmission rate of the streaming media, when an eleven-report window is chosen for the median filter 165. Accordingly, a designer of the adaption system 100 may choose the window length based on the desired degree of persistence in packet events 190 before the encoding or transmission rate is affected.

A rate controller 180 may adjust the encoding or transmission rate of the media based on the rate adjustment instructions. After the applicable rate is adjusted, the coder 120 may apply the new rate when encoding additional portions of the media that have not yet been streamed, or when transmitting additional portions of the media that have not yet been streamed. In an exemplary embodiment, since rate adjustment instructions may be received in a continuous stream from the rate adapter 170, the rate controller 180 may perform these adjustments dynamically. Accordingly, the encoding rate, the transmission rate, or both may change dynamically based on the feedback data 195, as adjusted by the median filter 165.

Figure 2:
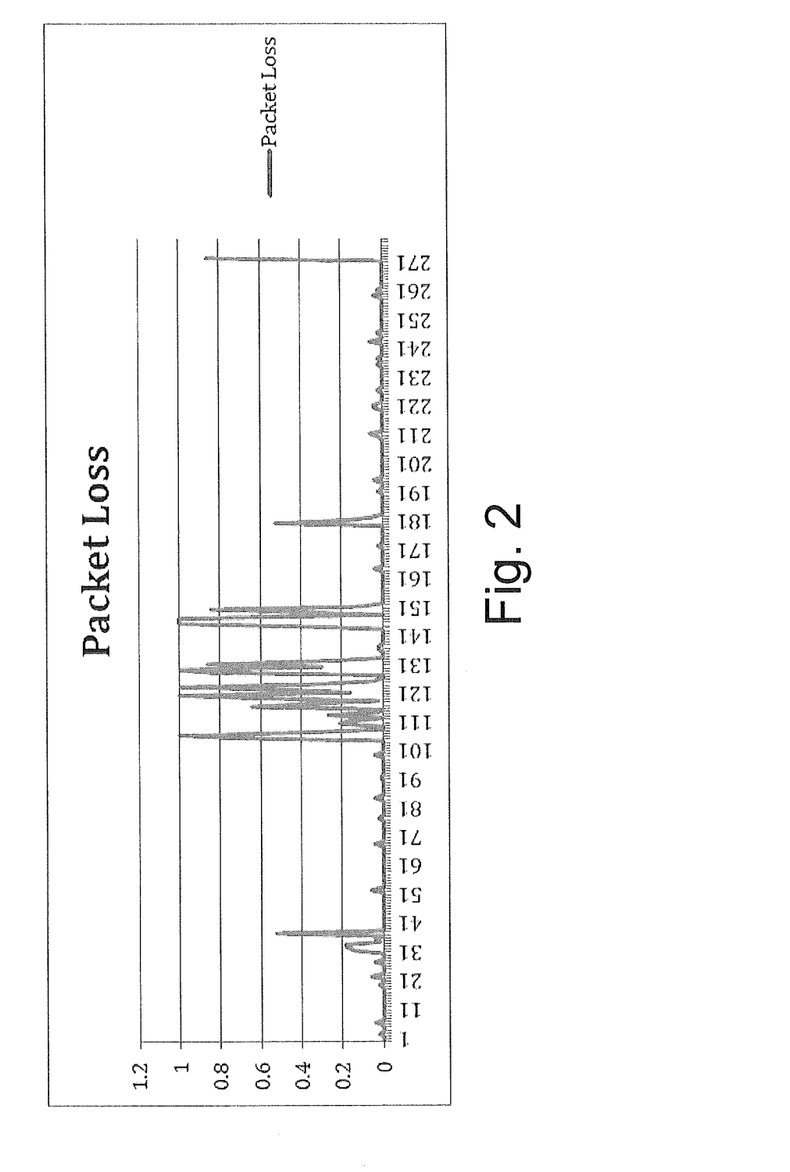
FIG. 2 is a graph illustrating exemplary packet loss in streaming media.

FIG. 2 is a graph illustrating actual packet loss in streaming media, given a particular exemplary implementation of the adaption system 100. This packet loss came from the logs of a mobile electronic device running on an enterprise WiFi network and moving around the interior of a building. The temporary packet losses shown are due to outages and handovers. The horizontal axis represents the various consecutive reports in the feedback data 195, while the vertical axis represents the percentage of packets that were lost.

FIG. 2 shows bursty packet loss of the sort that may result when streaming over a mobile network, which may be the case if one or both of the sending and receiving devices 105 and 108 are mobile electronic devices or if the network 110 is or includes a cellular network. Because the packet loss shown occurs mostly in bursts as opposed to, for example, having a continuous period of time where packets are lost in a somewhat consistent percentage, these packet loss bursts are not necessarily indicative of the network's general performance. Thus, reducing the encoding or transmission rate, or doing so significantly, may not be necessary to provide sufficient streaming results for the remainder of the media.

Figure 3:
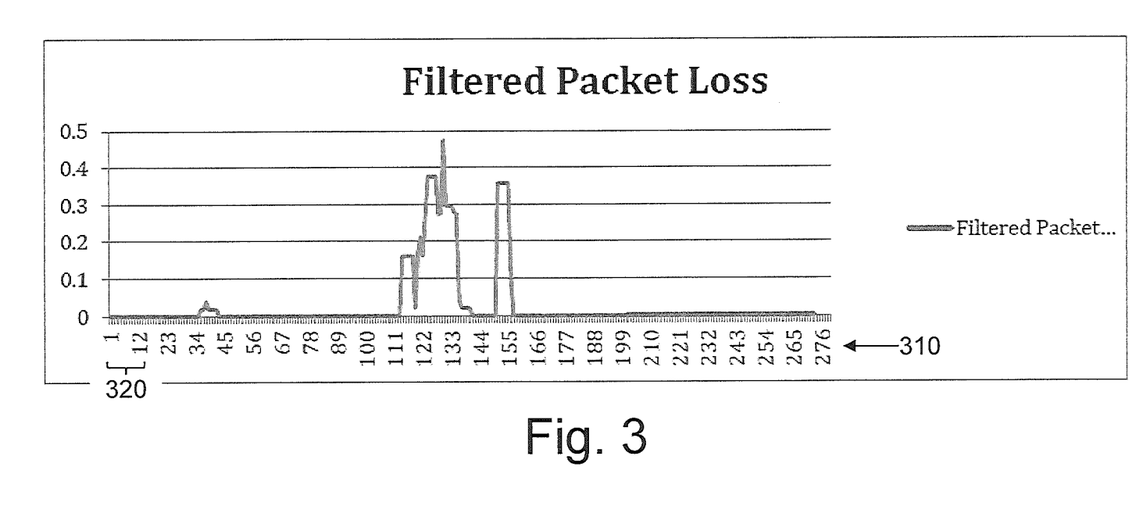
FIG. 3 is a graph illustrating packet loss after application of a median filter, according to an exemplary embodiment of this disclosure.

FIG. 3 is a graph illustrating the packet loss of FIG. 2 after application of a median filter 165, according to an exemplary embodiment of this disclosure. In this particular embodiment, the windows used by the median filter 165 were overlapping, with each window 320 beginning one report 310 after the prior one in the feedback data 195. The result of applying the median filter 165 was that the small bursts of packet losses were removed from the data, as such bursts were not persistent enough to survive the filter. As shown in FIG. 3, the median filter 165 mitigated the bursty packet loss in the ranges of the reports 310 numbered 31-35, 101-110, 178-182, and 270-271, as well as the smaller bursts throughout. Only the more persistent packet loss remained. Accordingly, which this data is fed into the rate adapter 170, the media rate may be less affected by the bursty packet losses, as desired.

Figure 4:
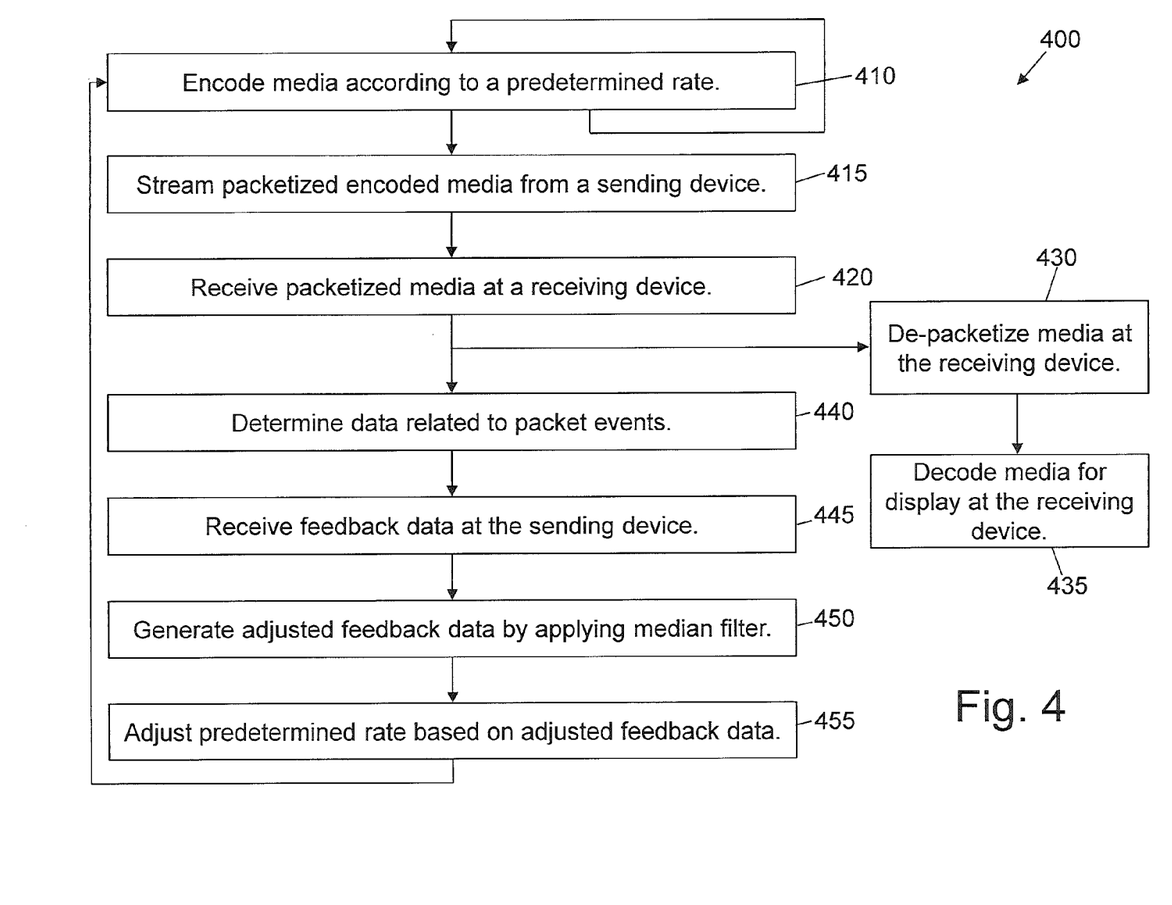
FIG. 4 is a flow diagram of a method for adapting the rate of media being streamed, according to an exemplary embodiment of this disclosure.

FIG. 4 is a flow diagram of an adaption method 400 for adapting a media rate, according to an exemplary embodiment of this disclosure. At block 410, media may be encoded according to an encoding rate. As shown in FIG. 4, this encoding may occur repeatedly to additional portions of the media. The encoding rate may change based on later activities in the method 400.

At block 415, after being packetized, the encoded media may be streamed across a network 110 from a sending device to a receiving device. At block 420, the packetized media may be received at the receiving device 108. At block 430, the received media may be de-packetized. At block 435, the received media may be decoded for display on the receiving device 108. At block 440, data may be determined related to packet events 190, e.g., lost packets, delayed packets, or both, that occurred while the packets of the media were being transmitted over the network 110. At block 445, this data may be received by the sending device 105 in the form of feedback data 195, after having been transmitted back across the network 110. At block 450, adjusted feedback data may be generated by applying a median filter 165 to the feedback data 195. Based on the output of the median filter 165, at block 455, the encoding rate of the media may be adjusted to adapt to the adjusted feedback data, which describes the packet events 190. Back at block 410, additional media may be encoded according to the adjusted encoding rate of the media.

It will be understood that, depending on the specific implementation used, various operations in the adaption method 400 shown in FIG. 4 may be removed, or additional operations may be added. Further, the operations shown may be rearranged as needed for a desired implementation. In some embodiments, the adaptions of the encoding rate shown in FIG. 4 may instead be replaced, or combined with, adaptions of the transmission rate.

Figure 5:
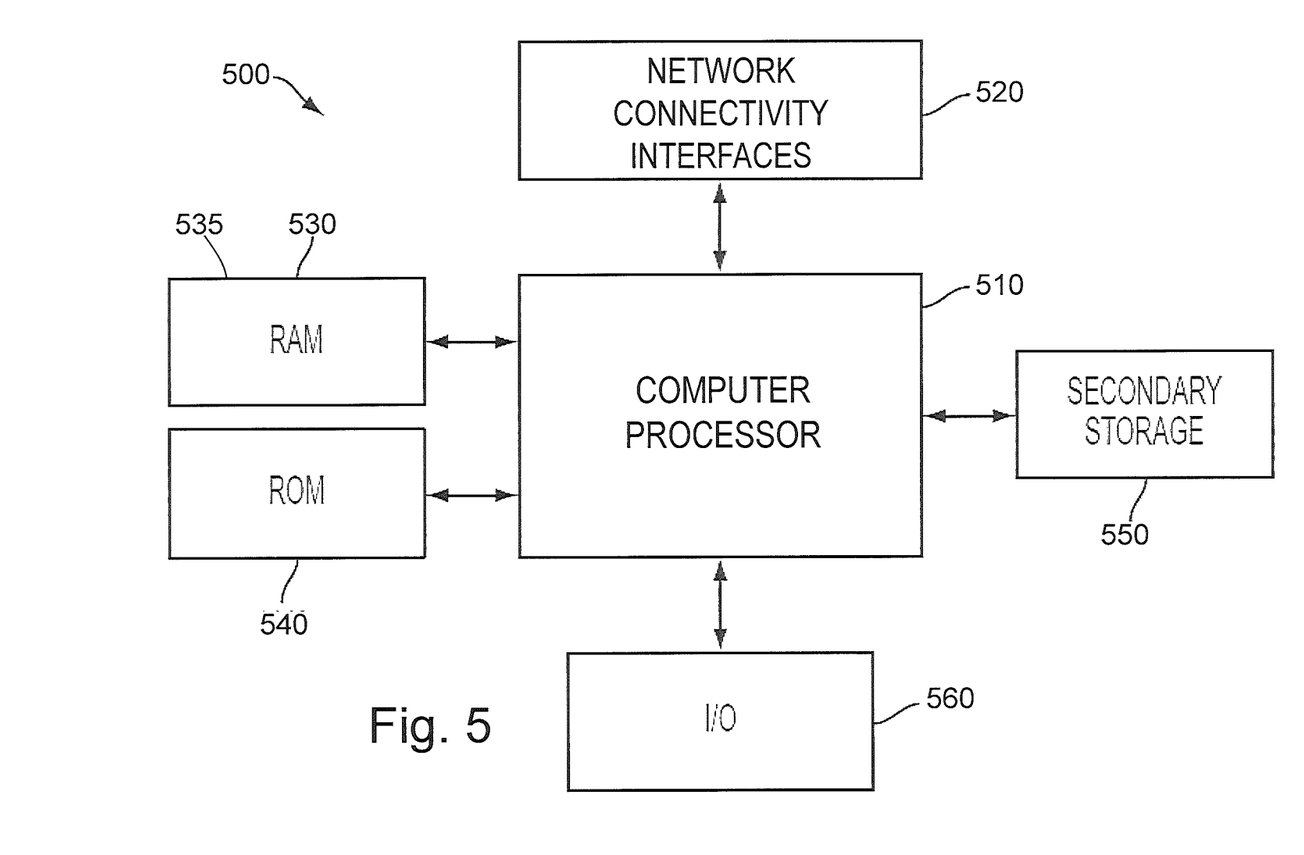
FIG. 5 is a block diagram of an exemplary device that facilitates adapting the rate of media being streamed, according to an exemplary embodiment of this disclosure.

FIG. 5 is a block diagram of an exemplary device 500 for facilitating adaption of an encoding rate, according to an exemplary embodiment of this disclosure. This device 500 may be, for example, and not by way of limitation, a mobile electronic device, a laptop or desktop computer, a tablet, or a network attached storage device.

The device 500 may include a computer processor 510, which in some embodiments may be a central processing unit (CPU), a digital signal processor (DSP), or an application processor (AP). The device 500 may also include one or more network connectivity interfaces 520, random access memory (RAM) 530, read-only memory (ROM) 540, secondary storage 550, and input/output (I/O) devices 560. In some embodiments, some of these components may not be present or may be combined in various combinations with one another or with components not shown. These components may be located in a single physical entity or across more than one physical entity. Actions described herein as being taken by the computer processor 510 might be taken by the computer processor 510 alone or by the computer processor 510 in conjunction with one or more components shown or not shown in FIG. 5.

The computer processor 510 may execute computer-readable instructions, codes, computer programs, or scripts that it might access from the network connectivity interfaces 520, RAM 530, ROM 540, or other computer-readable media. In some embodiments of this disclosure, for example, a computer program product 535 may be stored in a non-transitory computer-readable medium and executed by the computer processor 510 to implement some or all aspects of an exemplary adaption system 100 or method 400.

While only one computer processor 510 is shown, multiple computer processors may be present. Thus, while instructions may be discussed as being executed by a computer processor 510, the instructions may be executed simultaneously, serially, or otherwise by one or multiple computer processors 510, which may be implemented as one or more CPU chips.

In various embodiments, the network connectivity interfaces 520 may take the form of modems; modem banks; Ethernet devices; universal serial bus (USB) interface devices; serial interfaces; token ring devices; fiber distributed data interface (FDDI) devices; wireless local area network (WLAN) devices such as radio, optical, or infrared signals; radio transceiver devices such as code division multiple access (CDMA) devices, global system for mobile communications (GSM) radio transceiver devices, long term evolution (LTE) radio transceiver devices, worldwide interoperability for microwave access (WiMAX) devices; or other well-known interfaces for connecting to networks, such as Bluetooth or other personal area networks (PANs); or a combination of these. These network connectivity interfaces 520 may enable the computer processor 510 to communicate with the Internet, one or more telecommunications networks, or other networks from which the device 500 might receive information or to which the device 500 might output information.

The network connectivity interfaces 520 may be capable of transmitting or receiving data wirelessly in the form of electromagnetic waves, such as radio frequency signals or microwave frequency signals. Information transmitted or received by the network connectivity interfaces 520 may include data that has been processed by the computer processor 510 or instructions that are to be executed by computer processor 510.

The RAM 530 may be used to store volatile data and instructions that are executed by the computer processor 510. The ROM 540 may likewise be used to store instructions and data that are read during execution of the instructions. The secondary storage 550 may include one or more disk drives, solid state drives, tape drives, or a combination thereof and may be used for non-volatile storage of data or as overflow data storage if RAM 530 is not large enough to hold all working data.

The I/O devices 560 may include various devices used to receive data or output data, such as, for example, liquid crystal displays (LCDs), light-emitting diode (LED) displays, organic light emitting diode (OLED) displays, projectors, televisions, touch screen displays, keyboards, keypads, switches, dials, mice, track balls, track pads, voice recognizers, card readers, paper tape readers, printers, video monitors, and other well-known input or output devices.

Each or both of the sending device 105 and the receiving device 108 may be devices 500 such as that shown in FIG. 5. Alternatively such device 500 may be used to implement one or more of the various components of the adaption system 100.

Media as used herein can describe means of communication to a person using an electronic device and can include audio data, video data, and combinations thereof. The video data component of the media can include moving images, still images, and sequences of still images.

Examples described herein may provide benefits to mobile receiving devices that operate on cellular networks, LTE networks, or WiFi networks, among others. Such a mobile receiving device may experience a short-duration high-packet loss that may result in the sending device's drastically reducing the encoding rate or the packet transmission rate, e.g., at an exponential deduction or a step function reduction (such as by a factor of 4 or 5).

The increase of transmission rate after a prior decrease may be more conservative than the decrease, depending on the specific adaption algorithm used to modify the transmission rate based on the feedback data 195. It may therefore take minutes to increase the transmission rate back to the higher rate. Mobile devices that are subject to handover may have very short duration packet losses, which packet losses can be over 50% and can be up to 90%. Such high packet losses may bring the transmission rate down for a longer time period than is necessary. The present disclosure applies the median filter 165 to attempt to reduce the likelihood that short duration packet loss will reduce the transmission rate for a significant period when such a reduction in transmission rate is not necessary.

Analogously, when the adaption system 100 is used to adapt the encoding rate, the median filter 165 may be used to reduce the likelihood that the short duration packet loss will reduce the encoding rate when such reduction is not necessary.

Accordingly, various embodiments of this disclosure may enable media to be streamed at an appropriate quality, without being undesirably affected by bursty packet events, and such embodiments may be implemented, in whole or in part, by a mobile electronic device or other device.

What is claimed is:

1. A computer-implemented method to send media, the method comprising:
   encoding a first portion of media at an encoding rate;
   streaming the first portion of the media over a network from a sending device to a receiving device;
   receiving feedback data related to packet events occurring during transmission of the first portion of the media over the network;
   generating, by a computer processor, adjusted feedback data by applying a median filter to the feedback data, wherein applying the median filter eliminates one or more bursts of packet events reported across a first quantity of the packet events;
   adjusting the encoding rate of the media based on the adjusted feedback data; and
   encoding an additional portion of the media at the adjusted encoding rate.

2. The method of claim 1, further comprising repeating the generating the adjusted feedback data by applying the median filter, adjusting the encoding rate of the media, and encoding an additional portion of the media at the adjusted encoding rate until the entire media has been encoded.

3. The method of claim 1, wherein applying the median filter comprises generating a rolling median of the packet events.

4. The method of claim 1, wherein the feedback data comprises a plurality of windows comprising a plurality of reports.

5. The method of claim 4, wherein the median filter is applied over the windows, and wherein the first quantity is determined by what quantity of the reports are in each of the plurality of windows.

6. The method of claim 1, wherein the encoding rate is dynamically adapted based on the adjusted feedback data after application of the median filter.

7. A device configured to implement the method of claim 1.

8. A system, comprising:
- a coder configured to encode a first portion of media at an encoding rate;
- a packetizer configured to stream the first portion of the media over a network from a sending device to a receiving device;
- a filter unit configured to receive feedback data related to packet events occurring during transmission of the first portion of the media over the network, and to generate adjusted feedback data by applying a median filter to the feedback data, wherein applying the median filter eliminates one or more bursts of packet events reported across a first quantity of the reports;
- a rate controller configured to adjust the encoding rate of the media based on the adjusted feedback data; and
- the coder being further configured to encode an additional portion of the media at the adjusted encoding rate.

9. The system of claim 8, the rate controller being further configured to repeatedly adjust the encoding rate of the media, and the coder being further configured to encode an additional portion of the media at the adjusted encoding rate until the entire media has been encoded.

10. The system of claim 8, the filter unit being configured to apply the median filter by generating a rolling median of the packet events.

11. The system of claim 8, wherein the feedback data comprises a plurality of windows comprising a plurality of reports.

12. The system of claim 11, wherein the median filter is applied over the windows, and wherein the first quantity is determined by what quantity of the reports are in each of the plurality of windows.

13. The system of claim 8, the rate controller being further configured to dynamically adapt the encoding rate based on the adjusted feedback data after application of the median filter, and wherein the additional portion of the media is encoded with a different encoding rate than the first portion of the media.

14. A device comprising the system of claim 8.

15. A computer program product comprising a non-transitory computer readable storage medium having computer readable instructions embodied thereon, the computer readable instructions executable by a processor to perform a method, comprising:
- encoding a first portion of media at an encoding rate;
- streaming the first portion of the media over a network from a sending device to a receiving device;
- receiving feedback data related to packet events occurring during transmission of the first portion of the media over the network;
- generating adjusted feedback data by applying a median filter to the feedback data;
- adjusting the encoding rate of the media based on the adjusted feedback data, wherein applying the median filter eliminates one or more bursts of packet events reported across a first quantity of the packet events; and
- encoding an additional portion of the media at the adjusted encoding rate.

16. The computer program product of claim 15, the method further comprising repeating the generating the adjusted feedback data by applying the median filter, adjusting the encoding rate of the media, and encoding an additional portion of the media at the adjusted encoding rate until the entire media has been encoded.

17. The computer program product of claim 15, wherein applying the median filter comprises generating a rolling median of the packet events.

18. The computer program product of claim 15, wherein the feedback data comprises a plurality of windows comprising a plurality of reports.

19. The computer program product of claim 18, wherein the median filter is applied over the windows, and wherein the first quantity is determined by what quantity of the reports are in each of the plurality of windows.

20. The computer program product of claim 15, wherein the encoding rate is dynamically adapted based on the adjusted feedback data after application of the median filter, and wherein the additional portion of the media is encoded with a different encoding rate than the first portion of the media.

* * * * *